(12) United States Patent
Ziauddin et al.

(10) Patent No.: US 7,664,730 B2
(45) Date of Patent: Feb. 16, 2010

(54) METHOD AND SYSTEM FOR IMPLEMENTING A SQL PROFILE

(75) Inventors: Mohamed Ziauddin, Pleasanton, CA (US); Benoit Dageville, Foster City, CA (US); Mohamed Zait, San Jose, CA (US); Khaled Yagoub, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 447 days.

(21) Appl. No.: 10/936,205

(22) Filed: Sep. 7, 2004

(65) Prior Publication Data

US 2005/0125452 A1   Jun. 9, 2005

Related U.S. Application Data

(60) Provisional application No. 60/500,490, filed on Sep. 6, 2003.

(51) Int. Cl.
   *G06F 7/00*   (2006.01)
   *G06F 17/30*  (2006.01)
(52) U.S. Cl. .................. 707/2; 707/1; 707/3; 707/4
(58) Field of Classification Search .............. 707/2
   See application file for complete search history.

(56) References Cited

U.S. PATENT DOCUMENTS

| | | |
|---|---|---|
| 5,140,685 A | 8/1992 | Sipple et al. |
| 5,260,697 A | 11/1993 | Barrett et al. |
| 5,398,183 A | 3/1995 | Elliott |
| 5,408,653 A | 4/1995 | Josten et al. |
| 5,481,712 A | 1/1996 | Silver et al. |
| 5,504,917 A | 4/1996 | Austin |
| 5,544,355 A | 8/1996 | Chaudhuri et al. |
| 5,577,240 A | 11/1996 | Demers et al. |
| 5,634,134 A | 5/1997 | Kumai et al. |
| 5,724,569 A | 3/1998 | Andres |
| 5,737,601 A | 4/1998 | Jain et al. |
| 5,761,660 A | 6/1998 | Josten et al. |
| 5,765,159 A | 6/1998 | Srinivasan |
| 5,781,912 A | 7/1998 | Demers et al. |
| 5,794,227 A | 8/1998 | Brown |
| 5,794,229 A | 8/1998 | French et al. |
| 5,806,076 A | 9/1998 | Ngai et al. |
| 5,860,069 A | 1/1999 | Wright |
| 5,870,760 A | 2/1999 | Demers et al. |
| 5,870,761 A | 2/1999 | Demers et al. |

(Continued)

OTHER PUBLICATIONS

"Parametric Query Optimization", by Ioannidis et al., Proceedings of the 18 VLDB Conference, Vancouver, BC, Canada, 1992.*

(Continued)

*Primary Examiner*—Tim T. Vo
*Assistant Examiner*—Jay A Morrison
(74) *Attorney, Agent, or Firm*—Vista IP Law Group, LLP.

(57) ABSTRACT

A method, apparatus, and computer program product with a persistent data structure for storing a profile of tuning information for a query statement separately from the query statement. The profile in the persistent data structure includes a statement signature to identify the query statement, and an action to tune the statement.

25 Claims, 6 Drawing Sheets

U.S. PATENT DOCUMENTS

| | | | |
|---|---|---|---|
| 5,940,826 A | 8/1999 | Heideman et al. | |
| 5,963,933 A | 10/1999 | Cheng et al. | |
| 5,963,934 A | 10/1999 | Cochrane et al. | |
| 5,991,765 A | 11/1999 | Vethe | |
| 6,052,694 A | 4/2000 | Bromberg | |
| 6,122,640 A | 9/2000 | Pereira | |
| 6,195,653 B1 | 2/2001 | Bleizeffer et al. | |
| 6,212,514 B1 | 4/2001 | Eberhard et al. | |
| 6,275,818 B1 | 8/2001 | Subramanian et al. | |
| 6,321,218 B1 | 11/2001 | Guay et al. | |
| 6,330,552 B1 | 12/2001 | Farrar et al. | |
| 6,349,310 B1 | 2/2002 | Klein et al. | |
| 6,353,818 B1 * | 3/2002 | Carino, Jr. | 707/2 |
| 6,356,889 B1 | 3/2002 | Lohman et al. | |
| 6,366,901 B1 | 4/2002 | Ellis | |
| 6,366,903 B1 | 4/2002 | Agrawal et al. | |
| 6,374,257 B1 | 4/2002 | Guay et al. | |
| 6,397,207 B1 | 5/2002 | Bleizeffer et al. | |
| 6,397,227 B1 | 5/2002 | Klein et al. | |
| 6,434,545 B1 | 8/2002 | MacLeod et al. | |
| 6,434,568 B1 | 8/2002 | Bowman-Amuah | |
| 6,442,748 B1 | 8/2002 | Bowman-Amuah | |
| 6,460,027 B1 | 10/2002 | Cochrane et al. | |
| 6,460,043 B1 * | 10/2002 | Tabbara et al. | 707/100 |
| 6,493,701 B2 | 12/2002 | Ponnekanti | |
| 6,496,850 B1 | 12/2002 | Bowman-Amuah | |
| 6,513,029 B1 | 1/2003 | Agrawal et al. | |
| 6,529,901 B1 | 3/2003 | Chaudhuri et al. | |
| 6,560,606 B1 | 5/2003 | Young | |
| 6,571,233 B2 | 5/2003 | Beavin et al. | |
| 6,594,653 B2 | 7/2003 | Colby et al. | |
| 6,598,038 B1 | 7/2003 | Guay et al. | |
| 6,615,223 B1 | 9/2003 | Shih et al. | |
| 6,701,345 B1 | 3/2004 | Carley et al. | |
| 6,714,943 B1 | 3/2004 | Ganesh et al. | |
| 6,721,724 B1 | 4/2004 | Galindo-Legaria et al. | |
| 6,728,719 B1 | 4/2004 | Ganesh et al. | |
| 6,728,720 B1 | 4/2004 | Lenzie | |
| 6,744,449 B2 | 6/2004 | MacLeod et al. | |
| 6,763,353 B2 | 7/2004 | Li et al. | |
| 6,804,672 B1 | 10/2004 | Klein et al. | |
| 6,816,874 B1 * | 11/2004 | Cotner et al. | 707/204 |
| 6,839,713 B1 | 1/2005 | Shi et al. | |
| 6,850,925 B2 | 2/2005 | Chaudhuri et al. | |
| 6,865,567 B1 | 3/2005 | Oommen et al. | |
| 6,910,109 B2 | 6/2005 | Holman et al. | |
| 6,912,547 B2 | 6/2005 | Chaudhuri et al. | |
| 6,915,290 B2 | 7/2005 | Bestgen et al. | |
| 6,931,389 B1 | 8/2005 | Bleizeffer et al. | |
| 6,934,701 B1 | 8/2005 | Hall, Jr. | |
| 6,947,927 B2 | 9/2005 | Chaudhuri et al. | |
| 6,961,931 B2 | 11/2005 | Fischer | |
| 6,999,958 B2 * | 2/2006 | Carlson et al. | 707/3 |
| 7,007,013 B2 * | 2/2006 | Davis et al. | 707/3 |
| 7,031,958 B2 * | 4/2006 | Santosuosso | 707/3 |
| 7,047,231 B2 | 5/2006 | Grasshoff et al. | |
| 7,058,622 B1 * | 6/2006 | Tedesco | 707/2 |
| 7,080,062 B1 | 7/2006 | Leung et al. | |
| 7,139,749 B2 | 11/2006 | Bossman et al. | |
| 7,146,363 B2 | 12/2006 | Waas et al. | |
| 7,155,426 B2 | 12/2006 | Al-Azzawe | |
| 7,155,459 B2 | 12/2006 | Chaudhuri et al. | |
| 7,272,589 B1 | 9/2007 | Guay et al. | |
| 7,302,422 B2 | 11/2007 | Bossman et al. | |
| 7,353,219 B2 | 4/2008 | Markl et al. | |
| 2002/0073086 A1 * | 6/2002 | Thompson et al. | 707/10 |
| 2002/0120617 A1 | 8/2002 | Yoshiyama et al. | |
| 2002/0198867 A1 | 12/2002 | Lohman et al. | |
| 2003/0018618 A1 | 1/2003 | Bestgen et al. | |
| 2003/0065648 A1 | 4/2003 | Driesch et al. | |
| 2003/0088541 A1 | 5/2003 | Zilio et al. | |
| 2003/0093408 A1 | 5/2003 | Brown et al. | |
| 2003/0110153 A1 | 6/2003 | Shee | |
| 2003/0115183 A1 | 6/2003 | Abdo et al. | |
| 2003/0126143 A1 | 7/2003 | Roussopoulos et al. | |
| 2003/0130985 A1 | 7/2003 | Driesen et al. | |
| 2003/0135478 A1 | 7/2003 | Marshall et al. | |
| 2003/0154216 A1 | 8/2003 | Arnold et al. | |
| 2003/0177137 A1 | 9/2003 | MacLeod et al. | |
| 2003/0182276 A1 | 9/2003 | Bossman et al. | |
| 2003/0187831 A1 | 10/2003 | Bestgen et al. | |
| 2003/0200204 A1 * | 10/2003 | Limoges et al. | 707/3 |
| 2003/0200537 A1 | 10/2003 | Barsness et al. | |
| 2003/0229621 A1 | 12/2003 | Carlson et al. | |
| 2003/0229639 A1 * | 12/2003 | Carlson et al. | 707/100 |
| 2004/0002957 A1 | 1/2004 | Chaudhuri et al. | |
| 2004/0003004 A1 | 1/2004 | Chaudhuri et al. | |
| 2004/0019587 A1 * | 1/2004 | Fuh et al. | 707/2 |
| 2004/0034643 A1 | 2/2004 | Bonner et al. | |
| 2004/0181521 A1 | 9/2004 | Simmen et al. | |
| 2004/0210563 A1 | 10/2004 | Zait et al. | |
| 2004/0215626 A1 | 10/2004 | Colossi et al. | |
| 2005/0033734 A1 | 2/2005 | Chess et al. | |
| 2005/0097078 A1 | 5/2005 | Lohman et al. | |
| 2005/0097091 A1 | 5/2005 | Ramacher et al. | |
| 2005/0102305 A1 | 5/2005 | Chaudhuri et al. | |
| 2005/0119999 A1 | 6/2005 | Zait et al. | |
| 2005/0120000 A1 | 6/2005 | Ziauddin et al. | |
| 2005/0120001 A1 | 6/2005 | Yagoub et al. | |
| 2005/0125393 A1 | 6/2005 | Yagoub et al. | |
| 2005/0125398 A1 | 6/2005 | Das et al. | |
| 2005/0125427 A1 | 6/2005 | Dageville et al. | |
| 2005/0125452 A1 | 6/2005 | Ziauddin et al. | |
| 2005/0138015 A1 | 6/2005 | Dageville et al. | |
| 2005/0177557 A1 | 8/2005 | Ziauddin et al. | |
| 2005/0187917 A1 | 8/2005 | Lawande et al. | |
| 2005/0251523 A1 | 11/2005 | Rajamani et al. | |
| 2006/0004828 A1 | 1/2006 | Rajamani et al. | |
| 2006/0167883 A1 | 7/2006 | Boukobza | |
| 2007/0038618 A1 | 2/2007 | Kosciusko et al. | |

OTHER PUBLICATIONS

Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.

Almeida, et al., "Panasync: Dependency tracking among file copies", Proceedings of the 9th Workshop on ACM SIGOPS European Workshop: Beyond the PC: New Challenges for the Operating System, Kolding, Denmark, 2000, pp. 7-12.

Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.

Baldoni, et al., "Rollback-Dependency Trackability: Visible Characterizations", Proceedings of the 18th Annual ACM Symposium on Principles of Distributed Computing, Atlanta, GA, 1999, pp. 33-42.

Damani, et al, "Optimistic Distributed Simulation Based on Transitive Dependency Tracking", Proceedings of the 11th Workshop on Parellel and Distributed Simulation, IEEE, 1997, pp. 90-97.

Elnozahy, "On the Relevance of Communication Costs of Rollback-Recovery Protocols", Proceedings of the 14th Annual ACM Symposium on Principles of Distributed Computing, Ottawa, Ontario, Canada, 1995, pp. 74-79.

Garcia, et al., "On the Minimal Characterization of the Rollback-Dependency Trackability Property", 21st International Conference on Distributed Computing Systems, IEEE, Apr. 16-19, 2001, pp. 342-349.

Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.

Hellerstein, J.M. et al. "Adaptive Query Processing: Technologoy in Evolution", Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans", Proceedings of the 1998 ACM SIGMOD International Conference on Management of Data, SIGMOD'98, Seattle, WA, 1998, pp. 106-117.

Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.

Perry, "Consumer Electronics", IEEE Spectrum, Jan. 1997, vol. 34, No. 1, pp. 43-48.

Sadri,"Integrity Constraints in the Information Source Tracking Method", IEEE Transactions on Knowledge and Data, Feb. 1995, vol. 7, Issue 1, pp. 106-119.

Sreenivas, et al., "Independent Global Snapshots in Large Distributed Systems", Proceedings of the 4th International Conference on High Performance Computing, IEEE, Dec. 18-21, 1997, pp. 462-467.

Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.

Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.

Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.

Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.

Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.

Chaudhuri, S. et al. "Rethinking Database System Architecture: Towards a Self-Tuning RISC-style Database System" Proceedings of the 26th International Conference on Very Large Databases (VLDB 2000), Cairo, Egypt, Sep. 10-14, 2000, pp. 1-10.

Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.

Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.

Ganek, A.G. et al. "The dawning of the autonomic computing era" IBM Systems Journal, 2003, vol. 42, No. 1, pp. 5-18.

Gassner, P. et al. "Query Optimization in the IBM DB2 Family" Data Engineering, Dec. 1993, vol. 16, No. 4, pp. 4-18.

Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.

Gorman, T. "The Search for Intelligent Life in the Cost-Based Optimizer" Jul. 2001, v1.0, pp. 1-11.

IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.

Ives, Z.G. et al. "An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.

Lightstone, S.S. et al. "Toward Autonomic Computing with DB2 Universal Database" ACM SIGMOD Record, Sep. 2002, vol. 31, No. 3, pp. 55-61.

Markl, V. et al. "Leo: An autonomic query optimizer for DB2" IBM Systems Journal, 2003, vol. 42, No. 1, pp. 98-106.

Scheuermann, P. et al. "Adaptive Algorithms for Join Processing in Distributed Database Systems" Distributed and Parallel Databases, 1997, vol. 5, pp. 233-269.

Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.

Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.

Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.

Office Action dated Apr. 20, 2007 for U.S. Appl. No. 10/936,449.
Office Action dated May 2, 2007 for U.S. Appl. No. 10/935,908.
Office Action dated Feb. 7, 2007 for U.S. Appl. No. 10/936,781.
Office Action dated Jul. 30, 2007 for U.S. Appl. No. 10/936,781.
Office Action dated Feb. 22, 2007 for U.S. Appl. No. 10/936,468.
Office Action dated Aug. 22, 2007 for U.S. Appl. No. 10/936,468.
Office Action dated Jan. 25, 2007 for U.S. Appl. No. 10/935,906.
Office Action dated Aug. 9, 2007 for U.S. Appl. No. 10/935,906.
Office Action dated Jan. 24, 2007 for U.S. Appl. No. 10/936,779.
Office Action dated Aug. 22, 2007 for U.S. Appl. No. 10/936,779.
Office Action dated Mar. 9, 2007 for U.S. Appl. No. 10/936,469.
Office Action dated Oct. 17, 2007 for U.S. Appl. No. 10/936,469.
Office Action dated May 1, 2007 for U.S. Appl. No. 10/936,426.
Office Action dated Sep. 6, 2007 for U.S. Appl. No. 10/936,426.
Office Action dated Jan. 26, 2007 for U.S. Appl. No. 10/936,427.
Office Action dated Aug. 22, 2007 for U.S. Appl. No. 10/936,427.
Office Action dated Jan. 25, 2007 for U.S. Appl. No. 10/936,778.
Office Action dated Nov. 25, 2008 for U.S. Appl. No. 10/935,906.
Office Action dated Apr. 8, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Sep. 23, 2008 for U.S. Appl. No. 10/936,426.
Office Action dated Mar. 20, 2008 for U.S. Appl. No. 10/936,426.
Office Action dated Nov. 10, 2008 for U.S. Appl. No. 10/936,781.
Office Action dated Apr. 1, 2008 for U.S. Appl. No. 10/936,781.
Office Action dated Oct. 15, 2008 for U.S. Appl. No. 10/936,468.
Office Action dated Mar. 18, 2008 for U.S. Appl. No. 10/936,427.
Office Action dated Apr. 2, 2008 for U.S. Appl. No. 10/936,468.
Office Action dated Sep. 22, 2008 for U.S. Appl. No. 10/936,449.
Office Action dated Oct. 20, 2008 for U.S. Appl. No. 10/935,908.
Office Action dated Jul. 17, 2008 for U.S. Appl. No. 10/935,908.
Office Action dated Apr. 30, 2008 for U.S. Appl. No. 10/935,908.
Office Action dated Dec. 29, 2008 for U.S. Appl. No. 10/936,468.
Office Action dated Dec. 11, 2008 for U.S. Appl. No. 10/936,469.
Office Action dated May 29, 2008 for U.S. Appl. No. 10/936,469.
Office Action dated Oct. 8, 2008 for U.S. Appl. No. 10/936,778.
Office Action dated Jul. 24, 2008 for U.S. Appl. No. 10/936,778.
Office Action dated Jan. 25, 2008 for U.S. Appl. No. 10/935,906.
Office Action dated Jan. 22, 2009 for U.S. Appl. No. 10/936,778.
Markl et al. "Learning Table Access Cardinalities with LEO" SIGMOD '02; Jun. 3-6, 2002, pg. 613.
Stillger et al. "LEO - DB2's Learning Optimizer" VLDB 2001.
Office Action dated Sep. 6, 2007 for U.S. Appl. No. 101936,449.
Office Action dated Mar. 28, 2008 for U.S. Appl. No. 10/936,449.
Office Action dated Mar. 4, 2009 for U.S. Appl. No. 10/936,449.
Office Action dated Apr. 3, 2009 for U.S. Appl. No. 10/936,468.
Office Action dated May 11, 2009 for U.S. Appl. No. 10/935,906.
Office Action dated May 12, 2009 for U.S. Appl. No. 10/936,779.
Office Action dated Mar. 31, 2009 for U.S. Appl. No. 10/936,427.
Office Action dated May 28, 2009 for U.S. Appl. No. 10/936,469.
Office Action dated Jul. 2, 2009 for U.S. Appl. No. 10/936,778.

* cited by examiner

METHOD AND SYSTEM FOR IMPLEMENTING A SQL PROFILE

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to co-pending applications "SQL TUNING SETS," with U.S. application Ser. No. 10/936,449, now published as U.S. Publication No. 2005/0125393; "AUTO-TUNING SQL STATEMENTS," with U.S. application Ser. No. 10/935,908, now published as U.S. Publication No. 2005/0120000; "GLOBAL HINTS," with U.S. application Ser. No. 10/936,781, now published as U.S. Publication No. 2005/0125398; "SQL TUNING BASE," with U.S. application Ser. No. 10/936,468, now published as U.S. Publication No. 2005/0097091; "AUTOMATIC LEARNING OPTIMIZER," with U.S. application Ser. No. 10/935,906, now published as U.S. Publication No. 2005/0119999; "AUTOMATIC PREVENTION OF RUN-AWAY QUERY EXECUTION," with U.S. application Ser. No. 10/936,779, now published as U.S. Publication No. 2005/0177557; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. application Ser. No. 10/936,469, now published as U.S. Publication No. 2005/0187917; "SQL STRUCTURE ANALYZER," with U.S. application Ser. No. 10/936,426, now published as U.S. Publication No. US 2005/0120001; "HIGH LOAD SQL DRIVEN STATISTICS COLLECTION," with U.S. application Ser. No. 10/936,427, now published as U.S. Publication No. 2005/0138015; "AUTOMATIC SQL TUNING ADVISOR," with U.S. application Ser. No. 10/936,778, now published as U.S. Publication No. 2005/0125427, all of which are filed Sep. 7, 2004 and are incorporated herein by reference in their entirety.

FIELD OF THE INVENTION

This invention is related to the field of electronic database management.

BACKGROUND

A SQL statement can perform poorly because the query optimizer selects a sub-optimal execution plan for the statement. Executing the sub-optimal plan can have a catastrophic impact on the performance of an application program running on the computer system. For example, poor execution plans often consume too much system resources like CPU, I/O, temporary disk space and memory. As a result, the entire application throughput can be impacted up to the point where the application is no longer functioning to an acceptable level. In fact, a single poorly performing SQL statement has the potential to choke a database system and bring it down to its knees.

Usually, an optimizer selects a poor SQL execution plan because it lacks specific knowledge about the SQL statement to be optimized. For example, information about when the statement is executed is not available to the optimizer. As a result, the optimizer fails to select a plan to optimize a statement executed during peak hours using a goal of limiting resource consumption, and fails to optimize a plan for a statement that is executed during batch time using a goal of improving its response time.

Information about how the statement is executed is also typically missing. For example, if users are fetching all the rows from that statement, then the execution plan for the statement should return all rows of results. If only the first few rows of that query are fetched, then the execution plan for the statement can be optimized to return a few rows of the result. However, if this information is missing, or is supplied by a global parameter that is used by the optimizer for all statements, then this optimization decision is not made for that individual query.

Other information, such as if some objects accessed by that SQL statement are volatile, and whether default assumptions and estimates are accurate, is also typically missing. For example, a plan for executing a volatile object that uses dynamic sampling techniques, instead of relying on stored statistics, is not selected, because the optimizer is unaware of the volatility. Furthermore, if default assumptions made by the optimizer to estimate intermediate result cardinalities are inaccurate for that statement, the optimizer produces a sub-optimal plan. For example, the optimizer can assume predicate independence (i.e. no correlation), when correlation actually exists. Default assumptions for estimating access path cost may also be incorrect, causing a sub-optimal plan to be selected for a particular SQL statement.

SUMMARY

A persistent data structure for storing a profile of tuning information for a query statement separately from the query statement is disclosed. The persistent data structure includes a statement signature to identify the statement, and an action to tune the statement.

DETAILED DESCRIPTION

Overview

The embodiments of the invention are described using the term "SQL", however, the invention is not limited to just this exact database query language, and indeed may be used in conjunction with other database query languages and constructs.

An optimizer generates an execution plan for a SQL statement using hints from a SQL profile, which is a mechanism that is used to influence the plan that is generated by the optimizer. The profile contains information related to the statement, which is stored as a persistent database object, in a dictionary table, such as a tuning base. When the corresponding SQL statement is compiled (i.e., optimized), the query optimizer retrieves the SQL Profile from the tuning base. The SQL Profile is used by the optimizer, in conjunction with existing statistics, to produce a well-tuned plan for the corresponding SQL statement.

Figure 1:
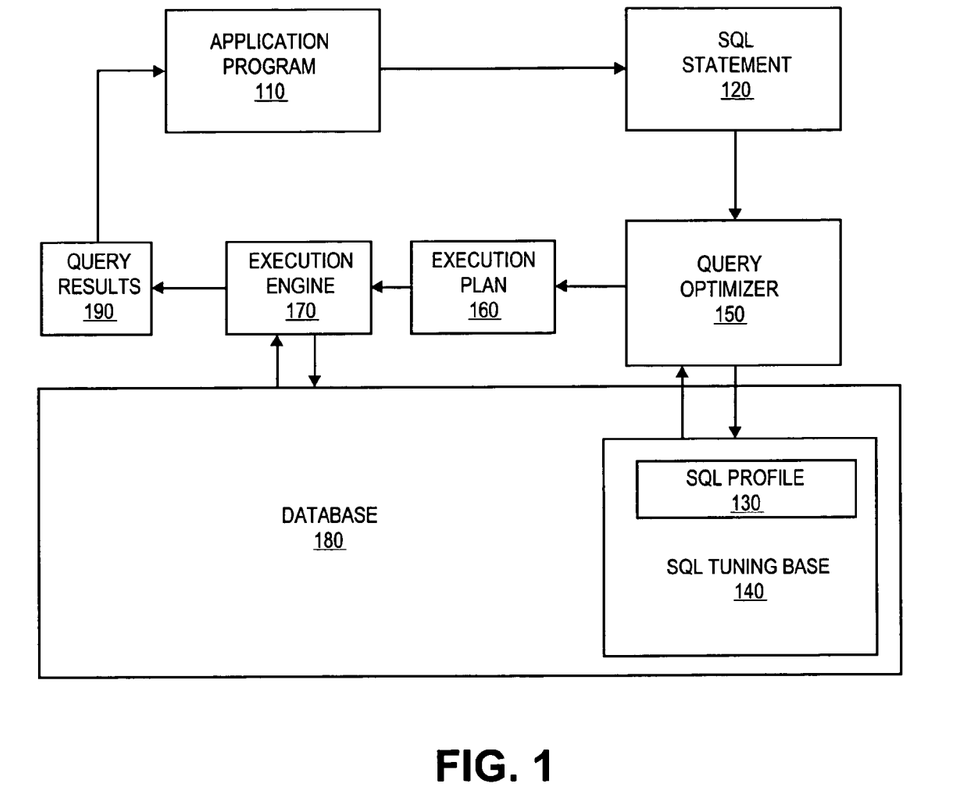
FIG. 1 shows an example of a mechanism that generates an execution plan using a profile.

FIG. 1 shows an example of a mechanism that generates an execution plan using a profile. An application program 110, which is running on a general purpose computer, issues a SQL statement 120 to retrieve certain information from database 180. A query optimizer 150 receives the statement, and retrieves the profile 130 for the statement stored in tuning base 140. The optimizer 150 uses tuning information from profile 130 to generate a well-tuned execution plan 160 for the statement 120. An execution engine 170 executes the plan and sends query results 190 to the application 110.

Figure 2:
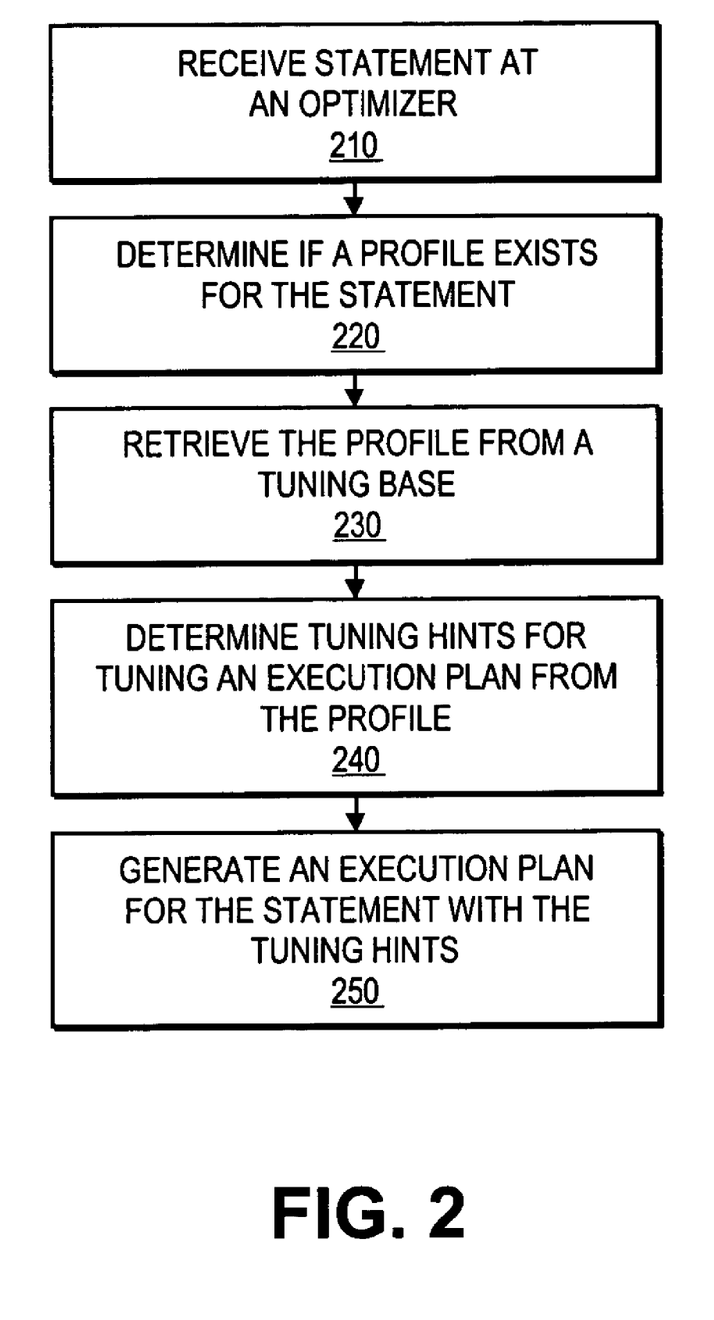
FIG. 2 shows an example of a method to generate an execution plan for a SQL statement with the SQL profile.

FIG. 2 shows an example of a method to generate an execution plan for a SQL statement with the SQL profile. A query optimizer receives the SQL statement, 210. The optimizer determines if a tuning base exists, and if so, if it is storing a SQL profile for the statement, 220. The profile is retrieved by the optimizer from a tuning base, 230. Tuning information stored in the profile is determined, 240. The optimizer generates an execution plan for the statement with the tuning information, 250.

One benefit of the profile is that it fully separates the SQL statement from the set of tuning information stored in the profile. As compared to the current mechanism that embeds tuning information in the query text of the statement itself, the profile, which is stored in a dictionary table that is external to the corresponding statement, can influence the plan generated by the optimizer, without modifying the SQL statement. Hence, the execution plan of the SQL statement can be tuned without changing the application source code for the statement. This allows tuning to be performed on SQL statements that are issued by packaged applications, by gathering and storing related information for the SQL statement within the database system itself. The profile therefore is a mechanism that can provide information for optimizing the statement from a source that is external to the statement.

Profile Information

Tuning can therefore be performed at the statement level or below, by using a profile. The profile can be created manually, by a performance expert. The profile may also be automatically created by the database system itself. The information in the profile can be used to adjust parameter settings of the optimizer, to tune the execution of the plan by the execution engine, or to adjust or correct mistaken statistics or estimates referenced by the statement.

Information for Adjusting Optimizer Settings

The profile can be used to customize a parameter setting of the optimizer when the associated statement is compiled. In general, the same optimizer parameter settings are applied to all queries submitted in a session. For example, the optimizer may be set to all rows, to produce a plan that returns all resulting rows returned by the statement, which is suitable if an application will fetch all the resulting rows. However, if an application will retrieve only a few rows of the statement's results, then a plan that returns all rows is sub-optimal. Giving the optimizer information about the number of rows that the end application or user will fetch from a query can greatly help the optimizer to produce a better execution plan. For example, if the optimizer is informed that only a few rows from a cursor are fetched, it can favor a plan with non-blocking operators, even if the total cost of that execution plan is high.

A profile for the statement provides a mechanism for delivering this information to the optimizer. For example, a statement has been previously executed six times, and has returned less than ten rows to the application after each execution. This information about the statement's execution history can be stored in a profile associated with this statement. When the optimizer compiles the statement, the profile is used to deliver the information about the statement's execution history to the optimizer. This information is used to change the optimizer setting from all rows to few rows when compiling this statement.

With the few row setting, the optimizer will produce a plan that, when executed, returns a few rows. This plan is more efficient, because partially executing the statement is enough to return the few rows. Therefore, less resources of the system are consumed, and less time is used to execute this statement.

Another optimizer setting is the amount of time that the optimizer uses to compile the statement. The profile may specify a maximum amount of time for the optimizer to spend on generating a plan for the statement. The time limit can be based on factors such as a search space for the statement, an optimization budget, or a number of permutations, for example. After compiling the plan for the statement, the optimizer's settings return to their previous modes.

Figure 3:
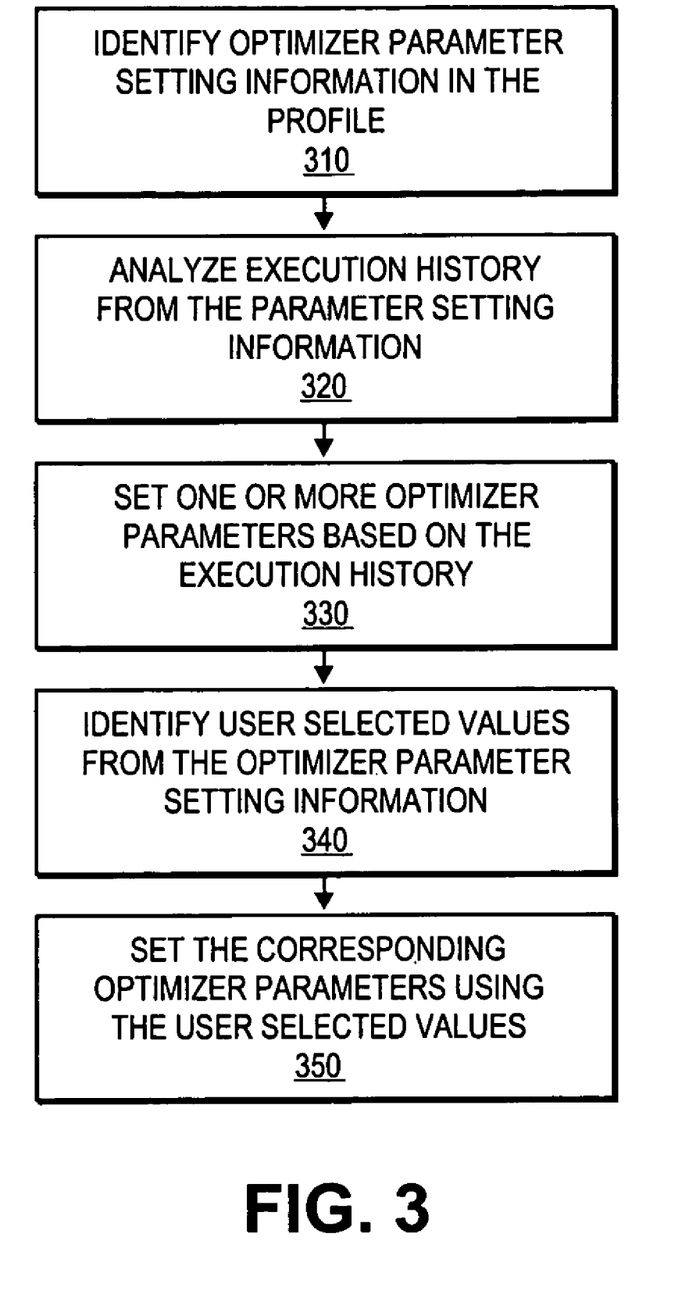
FIG. 3 shows an example of a method to set optimizer parameters using a profile.

FIG. 3 shows an example of a method to set optimizer parameters using a profile. Optimizer parameter setting information in the profile is identified, 310. The execution history for the statement may be included in the identified information. If so, then the execution history is analyzed, 320, and one or more optimizer parameters are set based on the execution history 330. For example, the optimizer can be set to produce a plan that returns a few rows, based on the execution history. If the user has selected settings, then this information is identified, 340. The user selected values are used to set the corresponding optimizer parameters, 350. For example, the user can set an optimizer time limit for generating the statement's execution plan.

Information for Adjusting Execution Parameters

In addition to setting the optimizer's parameters, the profile can include information that sets parameters of the execution engine in order to change the execution behavior of a statement to improve its performance. For example, a parallel setting can be used to cause portions of the query to be executed in parallel, or to change the degree of parallelism of a query. In the context of the SQL profile, this class of information could speed up key batch queries by parallelizing them, without touching the application source code.

The execution information in the profile can also change execution settings based on factors like an importance of execution of the statement (for example, an important statement can be executed before other statements), host system characteristics (e.g., IO/CPU bandwidth), index and data caching effects, and degree of concurrency (such as a number of concurrent users). For example, if the statement is generally executed during peak hours, with a high number of concurrent users, the statement should be optimized with the goal of limiting resource consumption. If it is executed during batch time, the statement should be optimized to improve its response time. This information can be provided to the optimizer with the profile.

Figure 4:
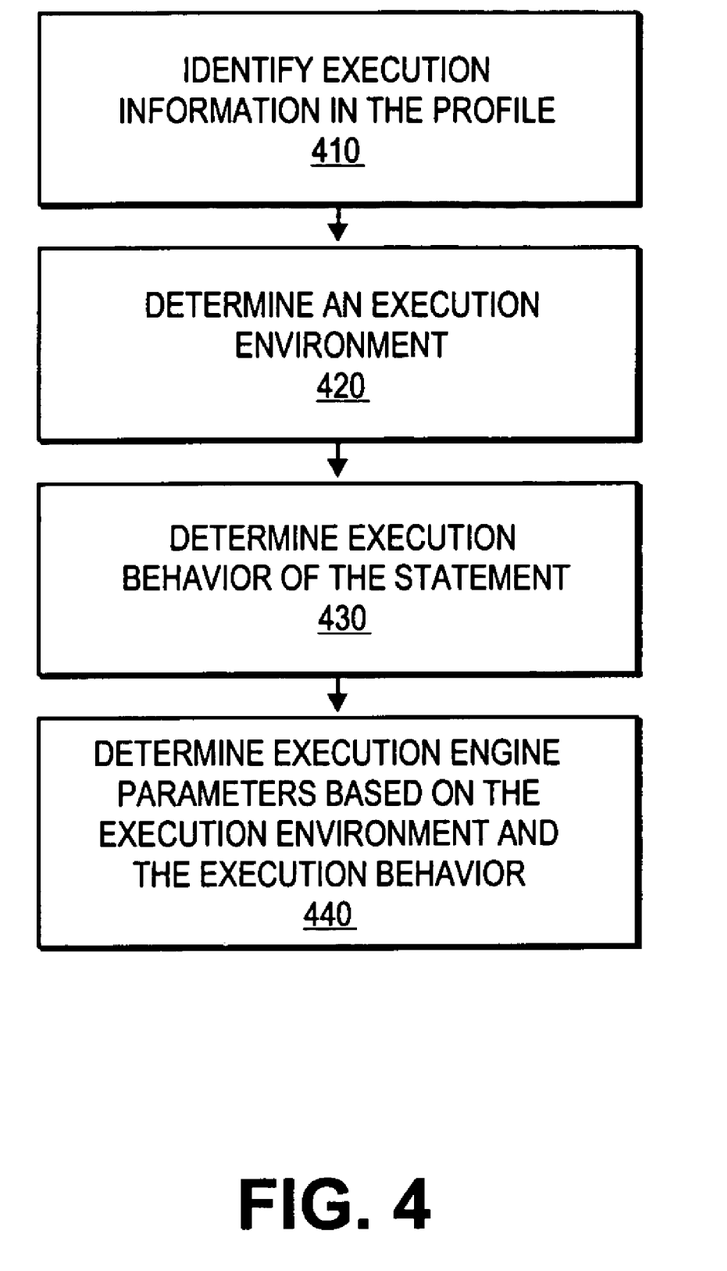
FIG. 4 shows an example of a method of using a profile to generate a plan that sets one or more parameters of an execution engine.

FIG. 4 shows an example of a method of using a profile to generate a plan that sets one or more parameters of an execution engine. Execution information for the statement is identified in the profile, 410. An execution environment of the system during execution is determined, 420. For example, an amount of system resources and an amount of use of the resources can be determined. Execution behavior of the statement, such as parallel execution for example, is also determined, 430. Based on the execution environment and the execution behavior of the statement, one or more execution engine parameters are determined, 440.

Information Related to Statistics

The information contained in a profile can also provide the optimizer with information for statistics that are referenced by the corresponding statement. For example, the regular statistics that are supplied to the optimizer may be stale or inaccurate. The profile can include information to correct stale or inaccurate statistics. This information may include a correct value, or it may be a relative correction factor.

If the statistic changes frequently, it is considered to be a volatile object. The corrective action for a volatile object instructs the optimizer to use dynamic sampling to determine a correct value.

Also, the profile can expand the type of data statistics that are collected and used by the optimizer. For example, certain statistics may be specific to the SQL statement, and are therefore not included in the regular statistics supplied to the optimizer. The profile can include information about these otherwise missing statistics.

Information Related to Estimates

In addition to providing information about basic statistics, the profile can provide information related to estimates for the cardinality of intermediate results of the query. These estimates can be single table estimates, join estimates, or query block estimates. The single table estimates can include, for example, an estimate for the number of rows, an estimate for a number of distinct values for each column of a table, or an estimate for the distribution of data in a column of the table. The single table estimates may be used by the optimizer to determine whether to use an index or a full scan for a given table. For example, it the data distribution of a column used in a predicate is skewed, the optimizer may assume that the data distribution is uniform. A histogram for the column can be provided by the profile to correct this mistake from being made by the optimizer.

Join estimates are used by the optimizer to compute the right join order and best access paths. Providing the correct cardinality of an intermediate result helps the optimizer to select the final execution plan. The estimation made by the optimizer may be incorrect, for example, when a predicate involves two correlated columns, but the optimizer assumes that the columns are uncorrelated. The profile can include information about the data correlation between columns. Also, if predicate is complex, the query optimizer may be unable to use standard statistical methods to determine the amount of data that will be filtered or joined by the predicate. For example, if columns are compared through a complex expression such as a*b/c=10, the optimizer is unable to determine the number of rows. This information can be provided by the profile.

Figure 5:
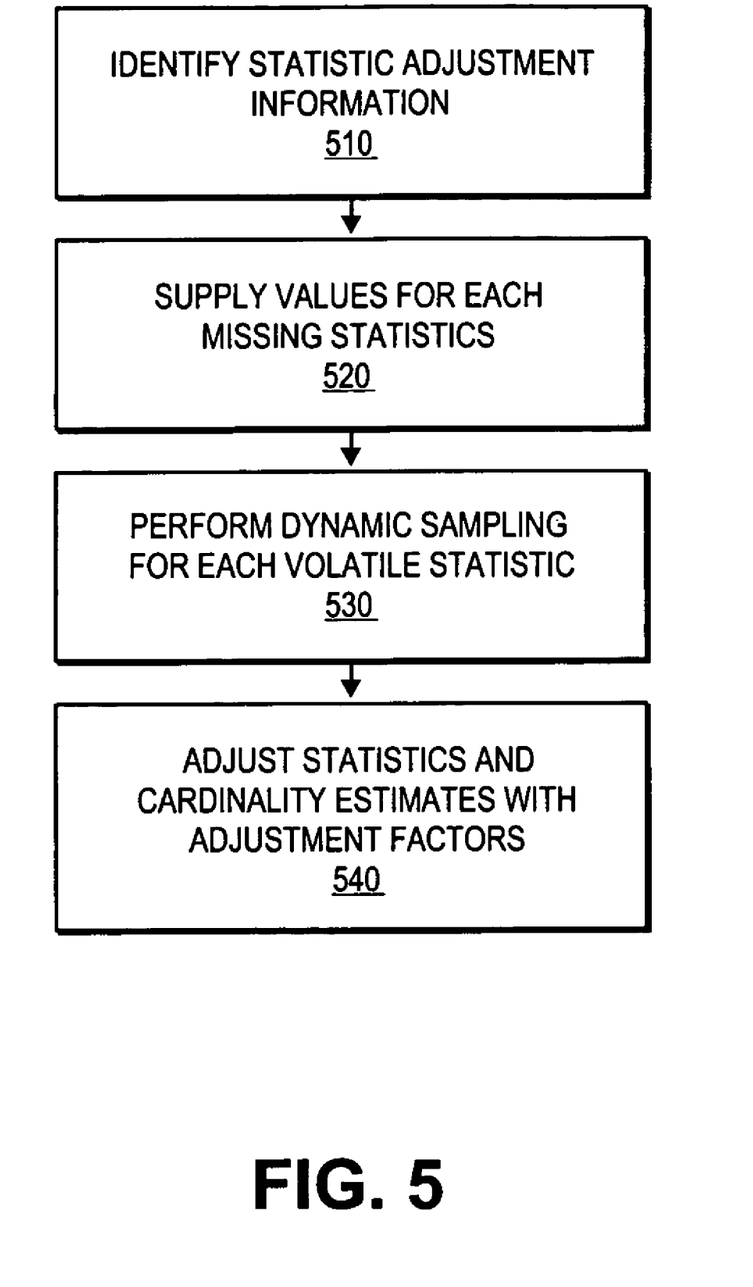
FIG. 5 shows an example of a method of adjusting statistics and estimates using a profile.

FIG. 5 shows an example of a method of adjusting statistics and estimates using a profile. The statistic adjustment information is identified, 510. For each inaccurate statistic, a corresponding adjustment factor from the profile is applied to the inaccurate statistic. For each missing statistic, a value for the missing statistic is supplied by the profile, 520. For each volatile statistic, the optimizer dynamically samples the statistic to determine an accurate value, 530. The optimizer also adjusts the cardinality of the single table estimates and join estimates, 540.

Information Related to Caching

Accounting for self-induced caching prevents the optimizer from under estimating index caching, especially self-induced caching where the query accesses the same subset of data blocks multiple times. For example, if the data blocks are cached after first being accessed, replacing a hash join with an index nested-loop join may cause the optimizer to create a better plan.

Tuning Actions Related to SQL Statement Information

Tuning actions can be associated with the settings, statistics, and estimates information for a statement, to guide the optimizer in creating an execution plan. The information, along with the tuning actions associated with the information, form the SQL profile. The profile may be automatically created during an auto-tuning process. The profile may also be manually created by a DBA. A tuning action can be applied to a single table, multiple tables, a query block, or to the statement.

Any tuning action may be a part of the profile. For example, the profile can associate one or more actions with any specific object in the statement, such as a table, index, view, or subquery, to cause the optimizer to take certain actions or to avoid considering some potential plans. The tuning actions stored in the profile can change the execution plan generated by the optimizer for the original SQL statement, without modifying the original statement. Therefore, a benefit of the profile is that it fully separates the SQL text from the corresponding tuning actions and tuning information.

An example of a profile that includes an action to be performed during optimization of the statement, and a rationale that explains the reasoning of applying the action, is an adjustment for an estimate used in generating a plan for the following:

select count (*)
    from employee e, dept d
    where e's department number=d's department number and
        e's salary>5,000

Suppose that the original cardinality estimate assumes that only 14 rows are returned by the join outer-table "employee," while in reality 10,000 rows are returned. The profile includes an action of applying a cardinality adjustment factor to the estimate of the join, in order to adjust this cardinality estimate for the optimizer to the correct number of 10,000. The rationale of applying the action is that the effective cardinality of table "employee" is 10,000 instead of 14.

Information Related to Execution Plans

If a profile is associated with the statement, the profile can also contain information related to the old execution plan generated without applying the tuning actions and information, and the new execution plan generated based on the tuning actions and information. For example, if a profile includes an action to drop a rarely used index, the DBA can determine the impact of dropping the rarely used index by comparing performance of the execution plans before and after the index is dropped.

Information for Associating a Profile and a Statement

A profile can be associated with a statement using a signature for the statement. When the statement is compiled, the profile can be identified and retrieved by the optimizer using the signature information.

A profile may be associated with multiple SQL statements. For example, several SQL statements may be normalized by removing constants from the statements. These normalized statements form a class of queries. If the profile contains information that is related to the class, the profile is associated with the class. In other words, the profile targets these statements, which are similar except for specific constants. When a statement from the class is to be executed, the corresponding profile for the class can be used by the optimizer to generate an execution plan for the statement. Also, several profiles can be associated with one SQL statement.

Profile Creation

A database administrator (DBA) can manually create a profile by explicitly specifying a set of tuning actions and other information. When creating the profile, the DBA also specifies the target SQL statement. The DBA may also specify a profile name and a profile category. The following example shows the creation of a profile:

```
create a profile
    'select * from employee e, department d
        where e's employee number = d's department number
        and e's name = '"scott"',        # hinted statement
    profile ( 'leading (q0.e)',
        'index (q0.e)'))                 # list of hints
```

In this example, the category is not specified. The profile is therefore associated with a default category. The tuning actions that are specified in the profile are not directly embedded in the corresponding SQL statement, but are stored separately. To allow the optimizer to be able to retrieve the profile when compiling the statement, the profile is created using a global hint syntax, as described in the related co-pending U.S. Application entitled "GLOBAL HINTS," filed Sep. 7, 2004. A manual profile can also be created on the text of a cached cursor. This may be performed by replacing the argument "sql statement" by a reference to the parent cursor.

A profile may be automatically created by performing an auto-tune process. For example, an auto-tune optimizer can execute fragments of the original query to determine, verify, or correct information for tuning the SQL statement. The auto-tune process can analyze information related to the statement to determine appropriate optimization settings. The process can also determine whether statistics and estimates associated with the statement are accurate. If not, adjustment factors can be produced in order to improve the accuracy of the statistics and estimates. After the tuning information is generated by the auto-tune process, a SQL profile is created to store the tuning information. The profile can be stored in a SQL tuning base (STB), as described in [Tuning base application]

Figure 6:
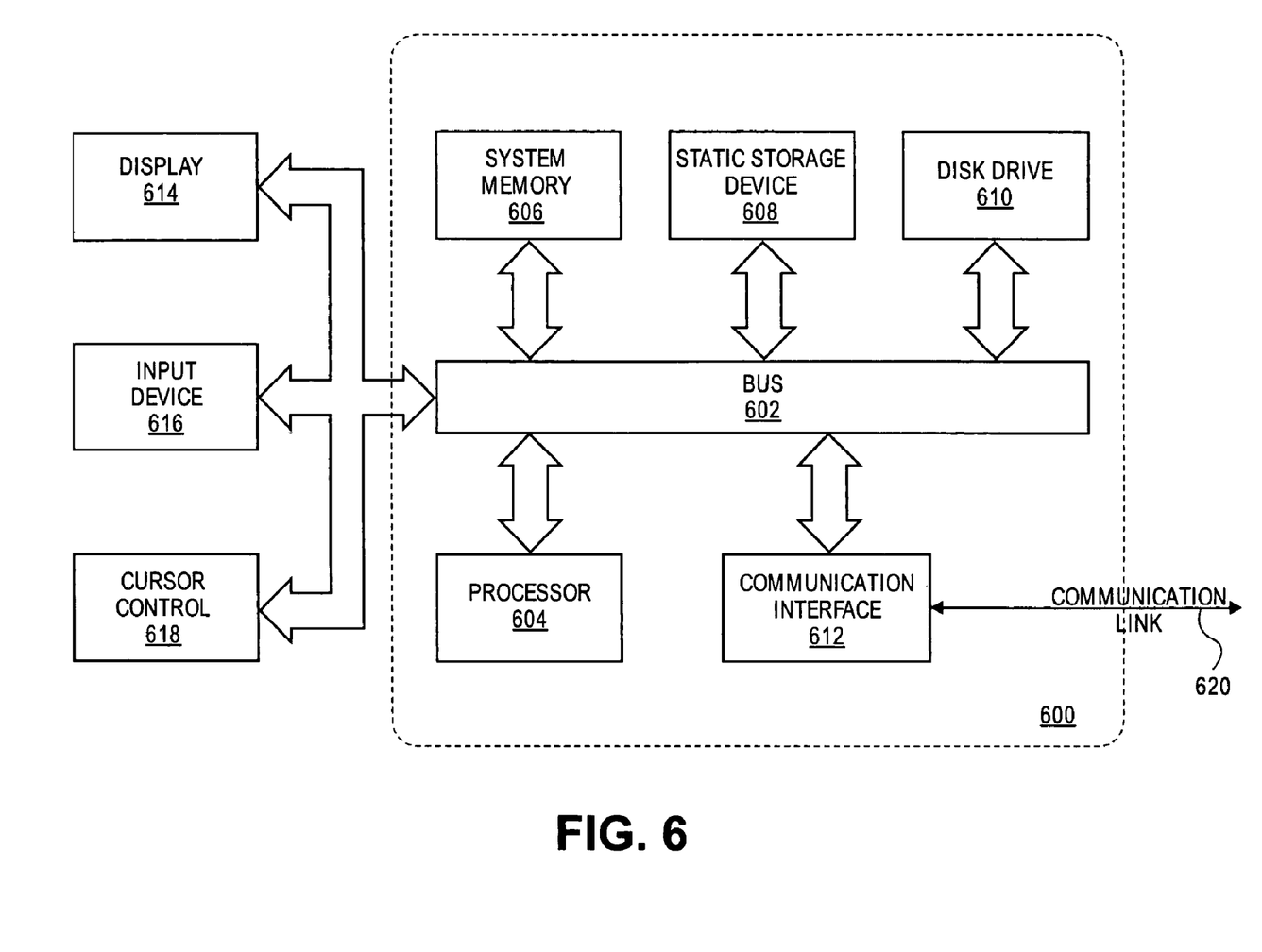
FIG. 6 is a block diagram of a computer system suitable for implementing an embodiment of the SQL profile.

FIG. 6 is a block diagram of a computer system 600 suitable for implementing an embodiment of SQL profiling. Computer system 600 includes a bus 602 or other communication mechanism for communicating information, which interconnects subsystems and devices, such as processor 604, system memory 606 (e.g., RAM), static storage device 608 (e.g., ROM), disk drive 610 (e.g., magnetic or optical), communication interface 612 (e.g., modem or ethernet card), display 614 (e.g., CRT or LCD), input device 616 (e.g., keyboard), and cursor control 618 (e.g., mouse or trackball).

According to one embodiment of the invention, computer system 600 performs specific operations by processor 604 executing one or more sequences of one or more instructions contained in system memory 606. Such instructions may be read into system memory 606 from another computer readable medium, such as static storage device 608 or disk drive 610. In alternative embodiments, hard-wired circuitry may be used in place of or in combination with software instructions to implement the invention.

The term "computer readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 600. According to other embodiments of the invention, two or more computer systems 600 coupled by communication link 620 (e.g., LAN, PTSN, or wireless network) may perform the sequence of instructions to practice the invention in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A computer program product comprising a volatile or non-volatile computer usable medium having executable code to execute a process for optimizing a query statement, the process comprising:
    storing a profile for the query statement in a data structure on a tangible computer usable medium or a computer storage device separately from the query statement;
    optimizing, by using a processor of a computer, the query statement using at least the profile, wherein the profile comprises:
        a tuning action for guiding generation or changing of an execution plan for the query statement without modifying the query statement;
        a statement signature to identify the query statement for retrieval of the profile for the query statement during compilation of the query statement; and
        tuning data to tune the query statement based at least in part on execution history of the query statement from at least one request with the query statement, wherein the at least one request was executed prior to a current compilation of the query statement, and
        without modifying the query statement, the tuning data are used to identify at least one optimizer setting for the current compilation of the query statement to generate or change the execution plan for the query statement.

2. The computer program product of claim 1, wherein the tuning data further comprises:
   execution behavior information for the query statement; and
   an action to set a parameter of an execution engine based on the execution behavior information.

3. The computer program product of claim 2, wherein the execution behavior information is selected from the group consisting of a degree of parallel execution of the query statement, a hardware characteristic of the execution engine, a data caching effect, and a degree of concurrent users.

4. The profile of claim 2, wherein the execution engine parameter is associated with a use of a resource to execute the query statement or with an amount of time to execute the query statement.

5. The profile of claim 1, wherein the tuning data further comprises:
   optimization information for the query statement; and
   an action to set a parameter of an optimizer based on the optimization information.

6. The profile of claim 5, wherein the optimization information is related to an execution history of the query statement.

7. The profile of claim 6, wherein the optimizer parameter is set to produce a plan for the query statement based on the execution history information.

8. The profile of claim 1, wherein the tuning data further comprises:
   information related to statistics referenced by the query statement; and
   an action to modify the statistics based on the information.

9. The profile of claim 8, wherein the information comprises a correction factor, and the action comprises an action to modify the statistics based on the correction factor.

10. The profile of claim 1, wherein the tuning data further comprises:
    information related to a cardinality estimate for the query statement; and
    an action to modify the cardinality estimate based on the information.

11. The computer program product of claim 1, wherein the query statement is a SQL statement.

12. A method of optimizing a query statement comprising:
    receiving the query statement at an optimizer;
    retrieving a profile for the query statement during compilation of the query statement at the optimizer;
    optimizing, by using a processor of a computer, the query statement using at least the profile, wherein
    the profile comprises:
       a tuning action for guiding generation or changing of an execution plan for the query statement without modifying the query statement;
       tuning data to tune the query statement based at least in part on execution history of the query statement from at least one request with the query statement; and
       a statement signature to identify the query statement for retrieval of the profile for the query statement during compilation of the query statement; and
    the at least one request was executed prior to a current compilation of the query statement, wherein the tuning data are used to identify or change one or more optimizer settings for a current compilation of the query statement to generate or change an execution plan for the query statement without modifying the query statement; and
    storing the profile in a first data structure on a tangible computer usable medium or a computer storage device separately from the query statement;
    storing the execution plan in the data structure or a second data structure on the tangible computer usable medium, a second tangible computer usable medium, or a computer storage device separately from the query statement or displaying the execution plan on a display apparatus.

13. The method of claim 12, further comprising:
    generating the execution plan for the query statement based on the profile.

14. The method of claim 13, wherein the act of generating the execution plan for the query statement based on the profile comprises:
    generating a plan to set a parameter of an execution engine based on the profile.

15. The method of claim 13, wherein the act of generating the execution plan comprises:
    determining a number of rows to return as a result of executing the query statement.

16. The method of claim 13, wherein the act of generating the execution plan comprises:
    determining a statistic referenced by the query statement based on the profile.

17. The method of claim 13, wherein the act of generating the execution plan comprises:
    changing a cardinality estimate of the query statement based on the profile.

18. The method of claim 12, wherein the query statement is a SQL statement.

19. An apparatus for optimizing a statement comprising:
    means for receiving a query statement at an optimizer; and
    means for retrieving a profile for the query statement during compilation of the query statement;
    means for optimizing the query statement, wherein
       the means for optimizing the query statement comprises a computer processor, the profile comprises:
          a tuning action for guiding generation or changing of an execution plan for the query statement without modifying the query statement;
          tuning data to tune the query statement based at least in part on execution history of the query statement from at least one request with the query statement; and
          a statement signature to identify the query statement for retrieval of the profile for the query statement during compilation of the query statement;
       the at least one request was executed prior to a current compilation of the query statement, wherein the tuning data are used to identify or change one or more optimizer settings for a current compilation of the query statement to generate an execution plan for the query statement without modifying the query statement; and
    a tangible computer usable medium or a computer storage device configured for storing the profile separately from the query statement in a first data structure; and
    the tangible computer usable medium, a second tangible computer usable medium, the computer storage device, or a second computer storage device configured for storing the execution plan separately from the query statement in the data structure or a second data structure or a display apparatus configured for displaying the execution plan.

20. The apparatus of claim 19, further comprising:

means for generating the execution plan for the query statement based on the profile.

21. The apparatus of claim 20, wherein the means for generating the execution plan for the query statement based on the profile comprises:

means for generating a plan to set a parameter of an execution engine based on the profile.

22. The apparatus of claim 20, wherein the means for generating the execution plan comprises:

means for determining a number of rows to return as a result of executing the query statement.

23. The apparatus of claim 20, wherein the means for generating the execution plan comprises:

means for determining a statistic referenced by the query statement based on the profile.

24. The apparatus of claim 20, wherein the means for generating the execution plan comprises:

means for changing a cardinality estimate of the query statement based on the profile.

25. The apparatus of claim 19, wherein the query statement is a SQL statement.

* * * * *

UNITED STATES PATENT AND TRADEMARK OFFICE
CERTIFICATE OF CORRECTION

PATENT NO. : 7,664,730 B2  Page 1 of 1
APPLICATION NO. : 10/936205
DATED : February 16, 2010
INVENTOR(S) : Mohamed Ziauddin et al.

It is certified that error appears in the above-identified patent and that said Letters Patent is hereby corrected as shown below:

On page 2, in column 2, under "Other Publications", line 18, delete "Parellel" and insert -- Parallel --, therefor.

On page 3, in column 1, under "Other Publications", line 1, delete "Technologoy" and insert -- Technology --, therefor.

On page 3, in column 1, under "Other Publications", line 37, delete "SIGART" and insert -- SIGACT --, therefor.

On page 3, in column 2, under "Other Publications", line 35, delete "8," and insert -- 9, --, therefor.

On page 3, in column 2, under "Other Publications", line 55, delete "2008" and insert -- 2007 --, therefor.

In column 7, line 19, delete "(q0.e)'))" and insert -- (q0.e)') --, therefor.

In column 7, line 31, delete ""sql" and insert -- "SQL --, therefor.

In column 7, line 46-47, after "application]" insert -- . --.

In column 8, line 24, delete "PTSN," and insert -- PSTN, --, therefor.

Signed and Sealed this

Fourteenth Day of September, 2010

David J. Kappos
*Director of the United States Patent and Trademark Office*